(12) United States Patent
Akkerman

(10) Patent No.: US 11,749,090 B1
(45) Date of Patent: Sep. 5, 2023

(54) TRACEABLE RECHARGEABLE BATTERY SYSTEM AND METHOD

(71) Applicant: Beach Road Assets, LLC, New York, NY (US)

(72) Inventor: Michael Akkerman, New York, NY (US)

(73) Assignee: BEACH ROAD ASSETS, LLC, New York, NY (US)

( * ) Notice: Subject to any disclaimer, the term of this patent is extended or adjusted under 35 U.S.C. 154(b) by 0 days.

(21) Appl. No.: 18/123,696

(22) Filed: Mar. 20, 2023

(51) Int. Cl.
*H04W 4/80* (2018.01)
*G08B 21/18* (2006.01)
*H02J 7/00* (2006.01)

(52) U.S. Cl.
CPC ........ *G08B 21/182* (2013.01); *H02J 7/00036* (2020.01); *H02J 7/0045* (2013.01); *H02J 7/0047* (2013.01); *H04W 4/80* (2018.02)

(58) Field of Classification Search
CPC ...... H04W 4/80; H04W 4/029; G08B 21/182; H02J 7/0045; H02J 7/0047; H02J 7/00036
See application file for complete search history.

(56) References Cited

U.S. PATENT DOCUMENTS

| | | | |
|---|---|---|---|
| 10,825,324 B2 | 11/2020 | Haviv et al. | |
| 2013/0154843 A1* | 6/2013 | Lan | G08B 21/0202 340/686.6 |
| 2016/0277879 A1 | 9/2016 | Daoura et al. | |
| 2018/0191169 A1 | 7/2018 | Biddle et al. | |
| 2022/0037705 A1 | 2/2022 | Iqbal et al. | |
| 2023/0141967 A1* | 5/2023 | Chauhan | H04B 7/0413 370/311 |

OTHER PUBLICATIONS

Strong, Curtis et al., "Android Application—Laird Toolkit (Proximity Functionality) v1.2," Lairdtech, Jan. 23, 2018.
Wang, Yapeng et al., "5. Bluetooth Positioning using RSSI and Triangulation Methods," 2013 IEEE 10th Consumer Communications and Networking Conference (CCNC), Jan. 11-14, 2023.

* cited by examiner

*Primary Examiner* — Tuan H Nguyen
(74) *Attorney, Agent, or Firm* — Fresh IP PLC; John R. Bednarz

(57) ABSTRACT

A method includes sending, by a computing device, a first communication to a battery device having a system on a chip (SoC) that is powering another device, receiving, by the computing device, a second communication in response to the first communication from the battery device, the second communication comprising a received signal strength indicator (RSSI) from the battery device to the computing device, displaying, by the computing device, a graphical user interface (GUI) that indicates the RSSI that provides real-time information in response to at least one of movement of the computing device and movement of the battery device, and sending, by the computing device, a third communication to the battery that when received by the battery device causes the battery device to provide at least one audible alert.

19 Claims, 16 Drawing Sheets

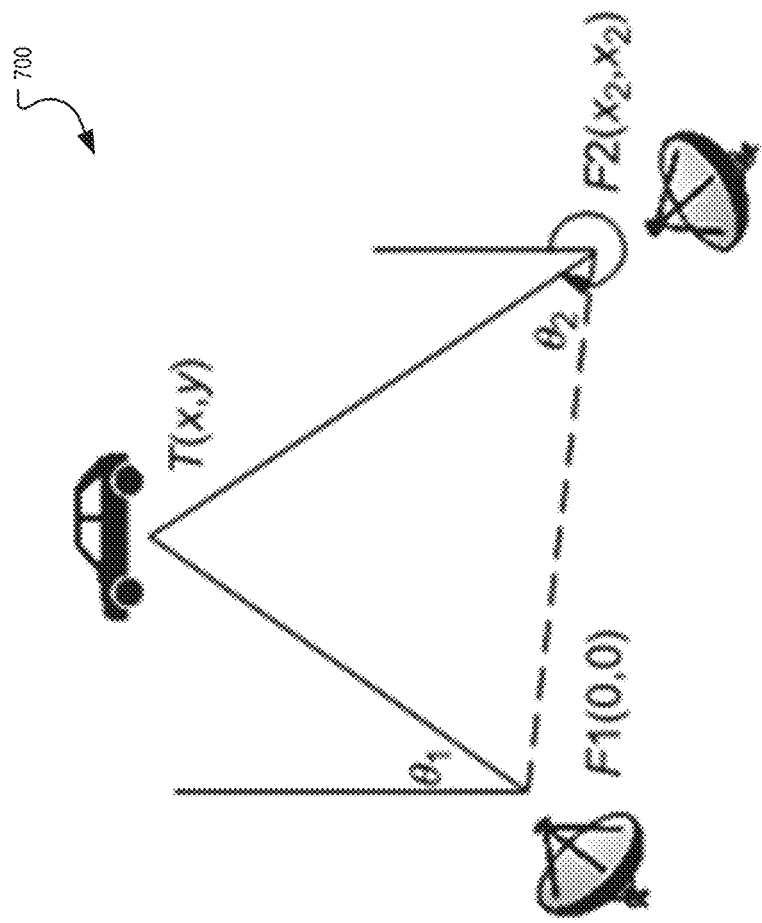
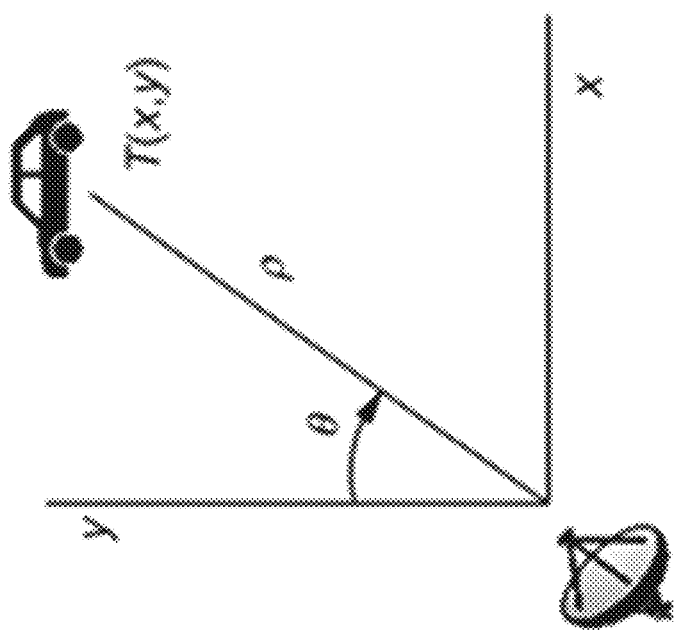
FIG. 7

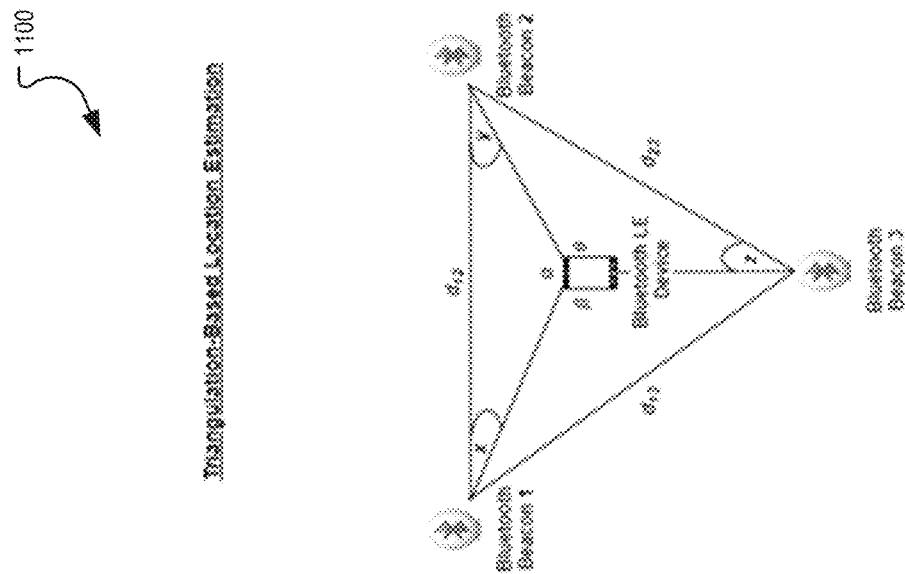
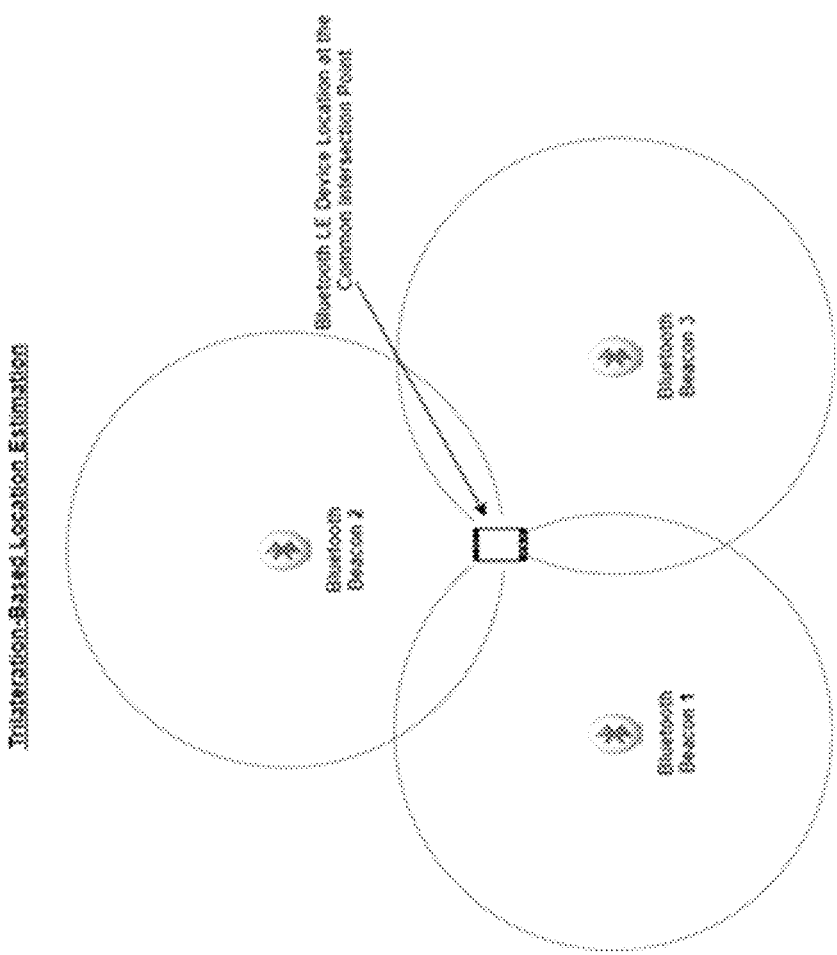
FIG. 11

TRACEABLE RECHARGEABLE BATTERY SYSTEM AND METHOD

BACKGROUND

In many instances, it can be difficult to locate an electronic device or object in a variety of different environments. As an example, in a residential or commercial environment, it can be easy to misplace the electronic device or object. This can be especially true when the electronic device is smaller in size. In many instances, a home may have a number of different remote controls or secondary electronic devices that can be used to operate a primary electronic device such as a television, a toy, or another electronic device. The remote control or secondary device can be easily misplaced or lost. Additionally, relying on line of sight to the human eye is inefficient and ineffective. In many instances, it may be dark or sources of illumination may not be available. Searching for the primary electronic device or a missing remote control or secondary electronic device can be time-consuming and frustrating. In many instances, the primary device, e.g., a television, may not be usable without the secondary device, e.g., a remote control.

It is with these issues in mind, among others, that various aspects of the disclosure were conceived.

SUMMARY

According to one aspect, a traceable rechargeable battery system may include one or more battery devices and one or more computing devices that communicate with one another. In one example, a computing device may have a battery tracing application to transmit at least one communication to each of the battery devices and determine a location of each of the battery devices. The battery tracing application also may transmit another communication to each of the battery devices to provide an alert such as an audible alert, a visual alert, and a haptic alert from the battery device. A rechargeable base station may be used to charge the battery devices and communicate with the one or more battery devices and the one or more computing devices. As a result, a user can locate each of the one or more battery devices.

According to an aspect, a method includes, sending, by a computing device, a first communication to a battery device having a system on a chip (SoC) that is powering another device, receiving, by the computing device, a second communication in response to the first communication from the battery device, the second communication comprising a received signal strength indicator (RSSI) from the battery to the computing device, displaying, by the computing device, a graphical user interface (GUI) that indicates the RSSI that provides real-time information in response to at least one of movement of the computing device and movement of the battery device, and sending, by the computing device, a third communication to the battery device that when received by the battery device causes the battery device to provide at least one audible alert. Additionally, the method may include receiving, by a charging base station configured to charge the battery device, the first communication from the battery device and receiving, by the charging base station, the second communication from the computing device, sending a fourth communication by the charging base station to be received by the battery device and the computing device, and determining, by the computing device, a location of the battery device using multi-dimensional triangulation using an angle of arrival (AoA) of each of the second communication and the fourth communication. The method may include receiving a request by a hardware button of the charging base station and sending, by the charging base station, another communication to the battery device that when received by the battery device causes the battery device to provide an alert.

According to another aspect, a system includes a computing device comprising a memory storing computer-readable instructions and at least one processor to execute the instructions to send a first communication to a battery device having a system on a chip (SoC) that is powering another device, receive a second communication in response to the first communication from the battery device, the second communication comprising a received signal strength indicator (RSSI) from the battery to the computing device, display a graphical user interface (GUI) that indicates the RSSI that provides real-time information in response to at least one of movement of the computing device and movement of the battery device, and sending a third communication to the battery device that when received by the battery device causes the battery device to provide at least one audible alert.

According to an additional aspect, a non-transitory computer-readable storage medium includes instructions stored thereon that, when executed by a computing device cause the computing device to perform operations, the operations including sending a first communication to a battery device having a system on a chip (SoC) that is powering another device, receiving a second communication in response to the first communication from the battery device, the second communication comprising a received signal strength indicator (RSSI) from the battery to the computing device, displaying a graphical user interface (GUI) that indicates the RSSI that provides real-time information in response to at least one of movement of the computing device and movement of the battery device, and sending a third communication to the battery device that when received by the battery device causes the battery device to provide at least one audible alert.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 7 illustrates another example location positioning methodology of a traceable battery device according to an example of the instant disclosure.

FIG. 11 illustrates triangulation-based location estimation of a traceable battery device according to an example of the instant disclosure.

DETAILED DESCRIPTION

Figure 1A:
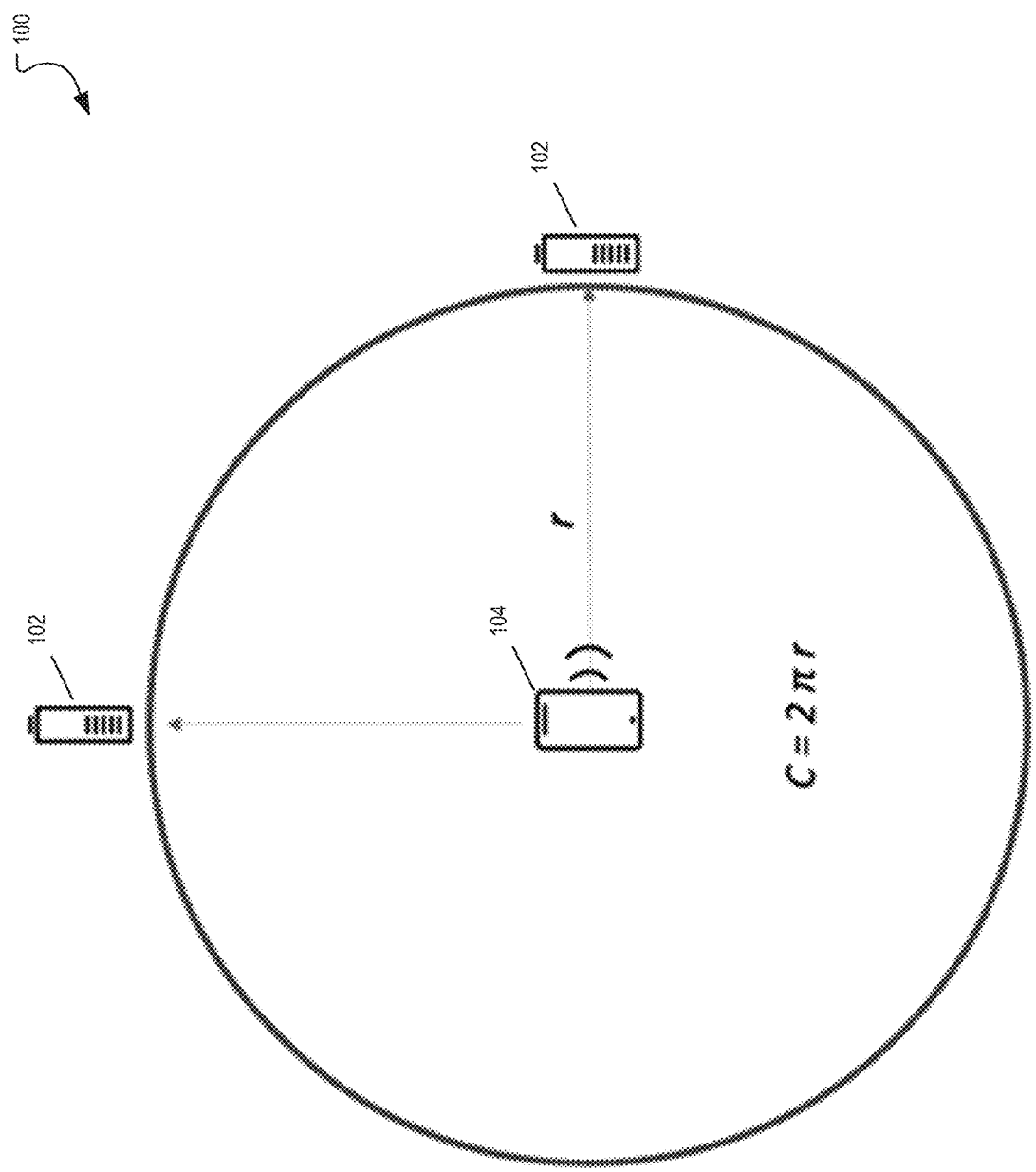
FIG. 1A is diagram of a traceable rechargeable battery system according to an example of the instant disclosure.

The present invention is more fully described below with reference to the accompanying figures. The following description is exemplary in that several embodiments are described (e.g., by use of the terms "preferably," "for example," or "in one embodiment"); however, such should not be viewed as limiting or as setting forth the only embodiments of the present invention, as the invention encompasses other embodiments not specifically recited in this description, including alternatives, modifications, and equivalents within the spirit and scope of the invention. Further, the use of the terms "invention," "present invention," "embodiment," and similar terms throughout the description are used broadly and not intended to mean that the invention requires, or is limited to, any particular aspect being described or that such description is the only manner in which the invention may be made or used. Additionally, the invention may be described in the context of specific applications; however, the invention may be used in a variety of applications not specifically described.

The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted. Further, the description is not to be taken in a limiting sense, but is made merely for the purpose of illustrating the general principles of the invention, since the scope of the invention is best defined by the appended claims.

It will be understood that, although the terms "first," "second," etc. may be used herein to describe various elements, these elements should not be limited by these terms. These terms are only used to distinguish one element from another. Purely as a non-limiting example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an," and "the" are intended to include the plural forms as well, unless the context clearly indicates otherwise. It should also be noted that, in some alternative implementations, the functions and/or acts noted may occur out of the order as represented in at least one of the several figures. Purely as a non-limiting example, two figures shown in succession may in fact be executed substantially concurrently or may sometimes be executed in the reverse order, depending upon the functionality and/or acts described or depicted.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

As technology continues to advance, electronic devices continue get smaller in size. This has a number of benefits. However, smaller electronic devices can easily get lost or misplaced. In addition, in many instances, the electronic device can be either a primary electronic device or a secondary electronic device that may be used to control or operate the primary electronic device. In one example, the secondary electronic device may be a remote control for the primary electronic device.

As an example, a primary electronic device such as a video game system may get lost in a couch having a number of cushions. Alternatively, a secondary electronic device such as a remote control may get lost in the couch. As another example, the remote control may get lost in an office amongst a number of office supplies and papers. In other cases, a child may accidentally leave the primary electronic device in a car and it may become misplaced. Many electronic devices such as primary electronic devices and secondary electronic devices utilize batteries.

Aspects of a system and method locating a traceable rechargeable battery may include a battery having a system on a chip (SoC) that is powering another device and a computing device that communicates to the battery to determine a location of the battery and may send another communication to activate one or more alerts such as an audible alert, a visual alert, and a haptic alert provided by the SoC. A number of consumer electronic devices such as secondary electronic devices can use batteries. As an example, the secondary electronic devices may include but are not limited to, game controllers, remote controls that may control another device such as a car, a television remote, a media device remote, and a streaming device remote, among others. In many instances, the consumer electronic devices that use the batteries may be small and prone to becoming lost or misplaced. It can be extremely frustrating to lose a primary electronic device or a secondary electronic device such as a remote control. Without a remote control, it may be impossible to use the primary electronic device.

The traceable rechargeable battery system includes one or more rechargeable batteries such as one or more double-A (AA) batteries, one or more triple-A (AAA) batteries, one or more C batteries, one or more D batteries, and one or more 9 volt batteries among others that can be coupled or communicate with a Bluetooth tracking device that may be associated with a system on a chip (SoC). The tracking device can be used to allow someone to easily locate a missing device that the battery is embedded in and powering, for example, a game controller, or a remote of another device such as a television or a child's toy, among others.

Each battery can be charged by placing the battery into a base unit that is plugged into a power socket or a powered universal serial bus (USB) plug, among others. The battery includes an embedded USB-C port that allows it to be charged. The base unit may utilize a USB-A cable or connector, a USB-A Mini cable or connector, a USB-A Micro cable or connector, a USB-B cable or connector, a USB-B Mini cable or connector, a USB-B Micro cable or connector, a USB-C cable or connector, and a lightning cable or connector, among others. Th connector is known as a receptacle and a connector attached to the cable is known as a plug. In addition, the base unit may be USB 1.1-2.0 or USB 3.0 and above.

The SoC associated with the Bluetooth tracking device includes at least one audio device or speaker that can make an audible set of alarms and noises. As another example, the SoC may have one or more linear actuators that may produce vibration feedback that can also be activated in addition to the audible set of alarms and noises.

To locate a battery, a user can utilize an accompanying mobile software application executed by a mobile computing device. The mobile software application can utilize a strength of a received signal strength indicator (RSSI) and direct or point a user in a general direction of the battery and therefore an associated item that is using the battery such as the remote of the child's toy, e.g., a remote control car or a controller for a video game console. As the user looks for the battery, the mobile software application can indicate whether the user is moving in a correct direction by indicating whether the user is closer or further away. The mobile software application also can be used to allow the battery to provide audible alarms or sirens to allow the user to locate the device. As another example, a user can push or select a corresponding button on an associated charging base station or unit to activate an alert on a corresponding battery to enable the battery to provide one of an audible alert, a visual alert, and a haptic alert.

In one example, a battery may be charged using an embedded universal serial bus (USB) C port that may be associated with the SoC. In another example, a battery may be charged by placing the battery into a battery charging base unit such as an off-the-shelf that is plugged into a power socket. In another example, the battery may be charged by placing the battery into an associated/coupled/paired battery charging base that may communicate with the one or more batteries, the SoC associated with each battery, or the mobile computing device.

The charging base unit may be configured to charge a number of different battery sizes, voltages, and capacities including AA batteries, AAA batteries, C batteries, D batteries, and 9V batteries, among others. Each battery may be recharged individually or simultaneously with more than one other battery. The charging base unit may have a display device such as an LED screen that may indicate a battery power level of each slot of the charging base unit. In addition, the charging base unit may have an associated button that may be a hardware button, a touchscreen button, or another type of button that when pushed can activate an alert associated with at least one corresponding battery to provide audible and/or visual alerts to locate the primary and/or secondary electronic devices.

If a battery is no longer in communication with a mobile computing device and an associated mobile computing application, an alert may be sent that indicates that the battery has 0% power remaining or another threshold of power remaining, e.g., 20%, 10%, 5%, among others. The alert may be a link loss alert that may indicate a location of the battery, e.g., a last known location, allowing the battery to be found and recharged. As another example, an alert could indicate that the battery is no longer charging/powering a secondary device, e.g., the battery may no longer be in the secondary device.

In one example, the traceable rechargeable battery system may utilize Bluetooth Received Signal Strength Indicator (RSSI). RSSI is a measure that represents a relative quality level of a Bluetooth signal received by a device. RSSI measurements for other devices may be provided by a Bluetooth hardware device or radio when the device scans for other Bluetooth devices. Based on the RSSI, a Bluetooth device can determine an approximate distance between a transmitter device and a receiver device. Bluetooth RSSI is one-dimensional and linear. It is possible to determine a relative distance from one object to another object, but it is difficult to determine a direction of the object. RSSI strength may define a radius and associated circle that can indicate a distance from a battery to the mobile computing device. However, the battery may be located anywhere on the circumference of the associated circle associated with a signal field.

In order to most accurately locate an associated device, it is desirable to have at least three points to create multi-dimensional triangulation by analyzing an angle of arrival (AoA) of each intersecting signal wave. By leveraging a battery as Point A or Point One, a charging base station or unit as Point B or Point Two, and a mobile computing device as Point C or Point Three, a more accurate triangulation may be used to locate the battery. Additionally, the battery may be associated with a Bluetooth Low Energy mesh network to create a many-to-many device network to allow other Bluetooth devices in a same location to assist in tracking and triangulating a battery. The system is able to provide multi-dimensional triangulation of each battery and cause one or more battery devices to emit an alert such as an audible alert, a visual alert, and a haptic alert, among others.

In one example, a method includes, sending, by a computing device, a first communication to a battery device having a system on a chip (SoC) that is powering another device, receiving, by the computing device, a second communication in response to the first communication from the battery device, the second communication comprising a received signal strength indicator (RSSI) from the battery to the computing device, displaying, by the computing device, a graphical user interface (GUI) that indicates the RSSI that provides real-time information in response to at least one of movement of the computing device and movement of the battery device, and sending, by the computing device, a third communication to the battery device that when received by the battery device causes the battery device to provide at least one audible alert.

Additionally, the method may include receiving, by a charging base station configured to charge the battery device, the first communication from the battery device and receiving, by the charging base station, the second communication from the computing device, sending a fourth communication by the charging base station to be received by the battery device and the computing device, and determining, by the computing device, a location of the battery device using multi-dimensional triangulation using an angle of arrival (AoA) of each of the second communication and the fourth communication. The method may include receiving a request by a hardware button of the charging base station and sending, by the charging base station, another communication to the battery device that when received by the battery device causes the battery device to provide an alert.

FIG. 1A shows a first diagram of a traceable rechargeable battery system 100 according to an example of the instant disclosure. As shown in FIG. 1A, there may be one or more traceable battery devices 102 that may be in communication with at least one computing device 104. As shown in FIG. 1A, the computing device may use Bluetooth Received Signal Strength Indicator (RSSI) to determine a distance, e.g., a radius r, from each traceable battery device to the computing device 104. RSSI is a measure that represents a relative quality level of a Bluetooth signal received by a device. The computing device may determine that each battery is located on a circumference of an associated circle using the equation C=2*pi*r.

Figure 1B:
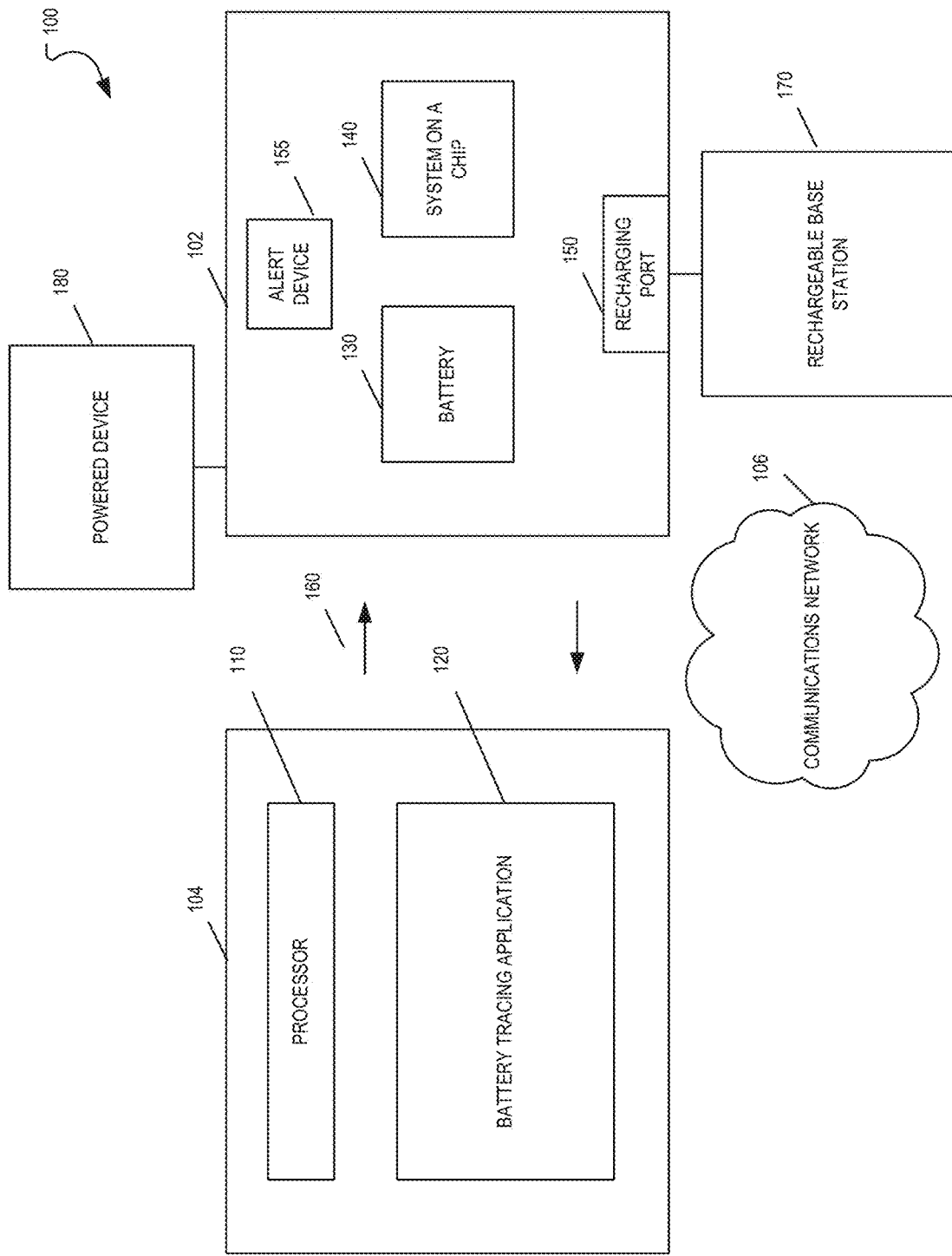
FIG. 1B is a block diagram of the traceable rechargeable battery system according to an example of the instant disclosure.

FIG. 1B shows a block diagram of the traceable rechargeable battery system 100 according to an example of the instant disclosure. The traceable rechargeable battery system 100 includes at least one computing device 104 that is in communication with at least one traceable battery device 102 via a communication network 106. The at least one computing device 104 may have an application or at least one component of an application, e.g., a battery tracing application 120.

The at least one computing device 104 is configured to receive data from and/or transmit data to the traceable battery device 102 through the communication network 106. Although the at least one computing device 104 is shown as a single computing device, it is contemplated that the at least one computing device 104 may include multiple computing devices.

The communication network 106 can be the Internet, an intranet, or another wired or wireless communication network. For example, the communication network 106 may include a Mobile Communications (GSM) network, a code division multiple access (CDMA) network, $3^{rd}$ Generation Partnership Project (GPP) network, an Internet Protocol (IP) network, a wireless application protocol (WAP) network, a WiFi network, a Bluetooth network, a Bluetooth Low Energy (BLE) network, a Bluetooth mesh network, a satellite communications network, an IEEE 802.11 standards network, a Zigbee network, or a Low Power Wide Area (LoRaWAN) network, a Z-wave network, an near-field communication (NFC) network, or a MQTT network, as well as various communications thereof. Other conventional and/or later developed wired and wireless networks may also be used.

The at least one computing device 104 includes at least one processor 110 to process data and memory to store data. The processor 110 processes communications, builds communications, retrieves data from memory, and stores data to memory. The processor 110 and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions such as a portion or component of the battery tracing application 120. In addition, the at least one computing device 104 further includes at least one communications interface to transmit and receive communications, messages, and/or signals.

In one example, the traceable battery device 102 may have at least one battery 130, a system on a chip (SoC) 140, and at least one recharging port 150 to charge the at least one battery 130. The traceable battery device 102 can be used to provide power to a powered device 180 such as an electronic device that may include a remote control or toy, among others. In one example, the recharging port 150 may be a universal serial bus (USB) C port or another type of port such as another type of USB port. FIG. 1B further shows communication 160 between the traceable battery device 102 and the computing device 104 that may be sent using the communications network 106. Additionally, as shown in FIG. 1B, there may be a rechargeable base station unit 170 that can be used to charge the traceable battery device 102. The rechargeable base station unit 170 may simultaneously charge a number of traceable battery devices 102.

The traceable battery device 102 includes at least one processor to process data and memory to store data that may be associated with or incorporated in the SoC 140. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions such as a portion or a component of the battery tracing application 120. In addition, the traceable battery device 102 further includes at least one communications interface to transmit and receive communications, messages, and/or signals.

Additionally, the traceable battery device 102 may include a Global Positioning System (GPS) hardware device, one or more accelerometers, and one or more magnetometers, one or more LiDAR sensors, Bluetooth hardware devices, and near-field communication (NFC) hardware devices, one or more audio hardware devices, one or more visual indicator devices such as light emitting diodes (LEDs), and one or more haptic hardware devices, among others.

The at least one computing device 104 can be a laptop computer, a smartphone, a personal digital assistant, a tablet computer, a standard personal computer, or another processing device. The at least one computing device 104 may include a display, such as a computer monitor, for displaying data and/or graphical user interfaces. The at least one computing device 104 may also include an input device, such as one or more cameras, a keyboard or a pointing device (e.g., a mouse, trackball, pen, or touch screen) to enter data into or interact with graphical and/or other types of user interfaces. In an example, the display and the input device may be incorporated together as a touch screen of the smartphone or tablet computer. Additionally, the at least one computing device 104 may include a Global Positioning System (GPS) hardware device for determining a particular location of the computing device 102, one or more accelerometers, and one or more magnetometers, one or more LiDAR sensors, Bluetooth hardware devices, and near-field communication (NFC) hardware devices, among others.

The at least one computing device 104 may display on the display a graphical user interface (or GUI). The graphical user interface may be provided by the battery tracing application 120. The graphical user interface enables a user of the at least one computing device 104 to interact with the battery tracing application 120 and locate the traceable battery device 102 in real-time.

The battery tracing application 120 may be a component of an application and/or service executable by the at least one computing device 104. For example, the battery tracing application 120 may be a single unit of deployable executable code or a plurality of units of deployable executable code. According to one aspect, the battery tracing application 120 may include one component that may be a web application, a native application, and/or a mobile application (e.g., an app) downloaded from a digital distribution application platform that allows users to browse and download applications developed with mobile software development kits (SDKs) including the APPLE App Store and GOOGLE PLAY®, among others.

The system 100 may also include a relational database management system (RDBMS) or another type of database management system such as a NoSQL database system that stores and communicates data from at least one database. The data stored in the at least one database may be associated with one or more traceable battery devices such as a unique identifier for each of the one or more traceable battery devices, a name for each of the one or more traceable battery devices, location information associated with each of the one or more traceable battery devices as well as battery percentage of each of the one or more traceable battery devices, among other information.

Figure 1C:
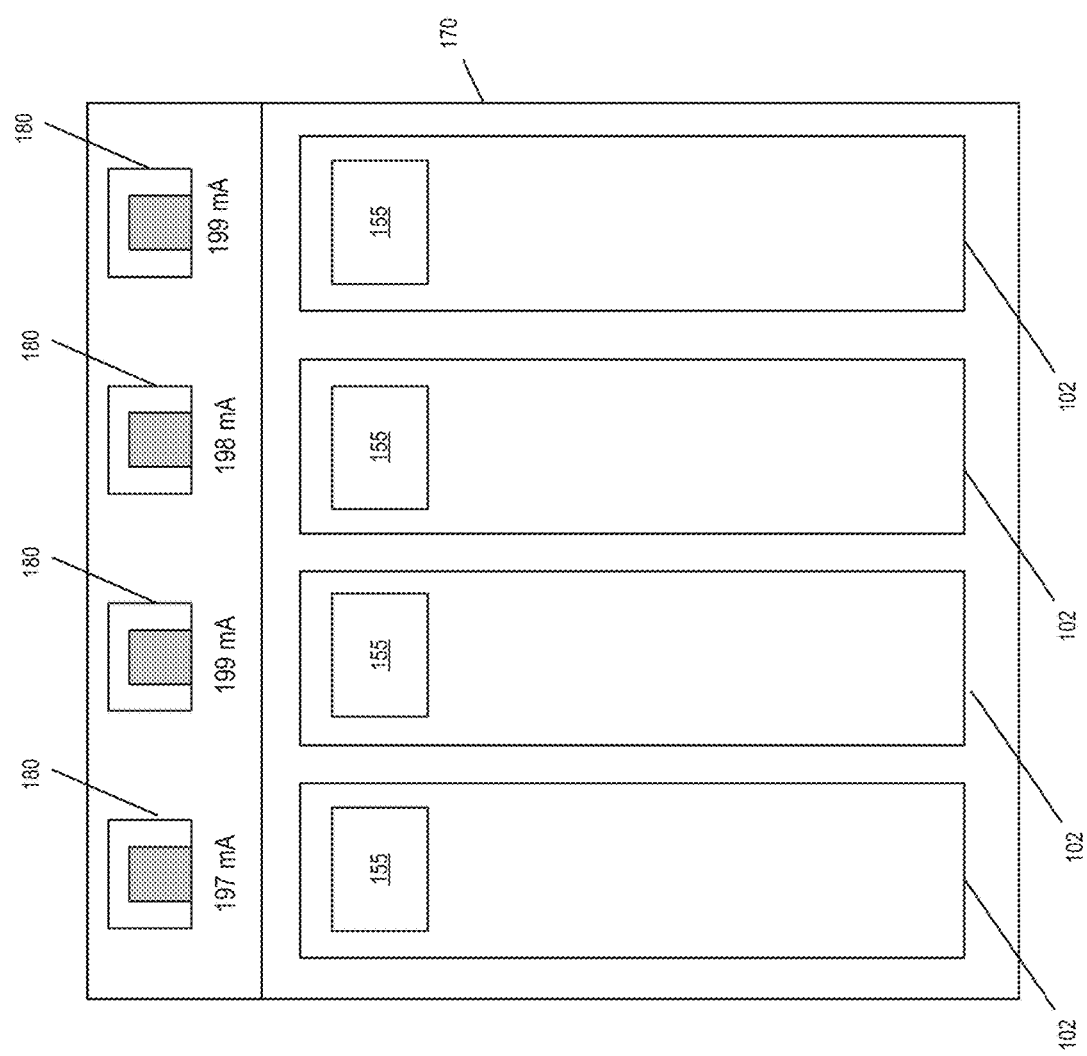
FIG. 1C is a block diagram of a rechargeable base station of the traceable rechargeable battery system according to an example of the instant disclosure.

FIG. 1C is a block diagram of a rechargeable base station 170 of the traceable rechargeable battery system 100 according to an example of the instant disclosure. As shown in FIG. 1C, the rechargeable base station 170 may be used to charge one or more battery devices 102. The one or more battery devices 102 may be associated with different size batteries 130 such as AA and AAA, among others. Each of the one or more battery devices 102 may have a button 180 that may be a hardware button, a touchscreen button, or another type of button that when pushed can activate an alert associated with at least one corresponding battery to provide audible and/or visual alerts to locate the primary and/or secondary electronic devices. The button 180 may indicate a level of charge of the respective battery with a visual indication that is a representation of the charge. As shown in FIG. 1C, each of the batteries is approximately at 100% charge. A first battery has 197 mA, a second battery has 199 mA, a third battery has 198 mA, and a fourth battery has 199 mA.

Figure 2:
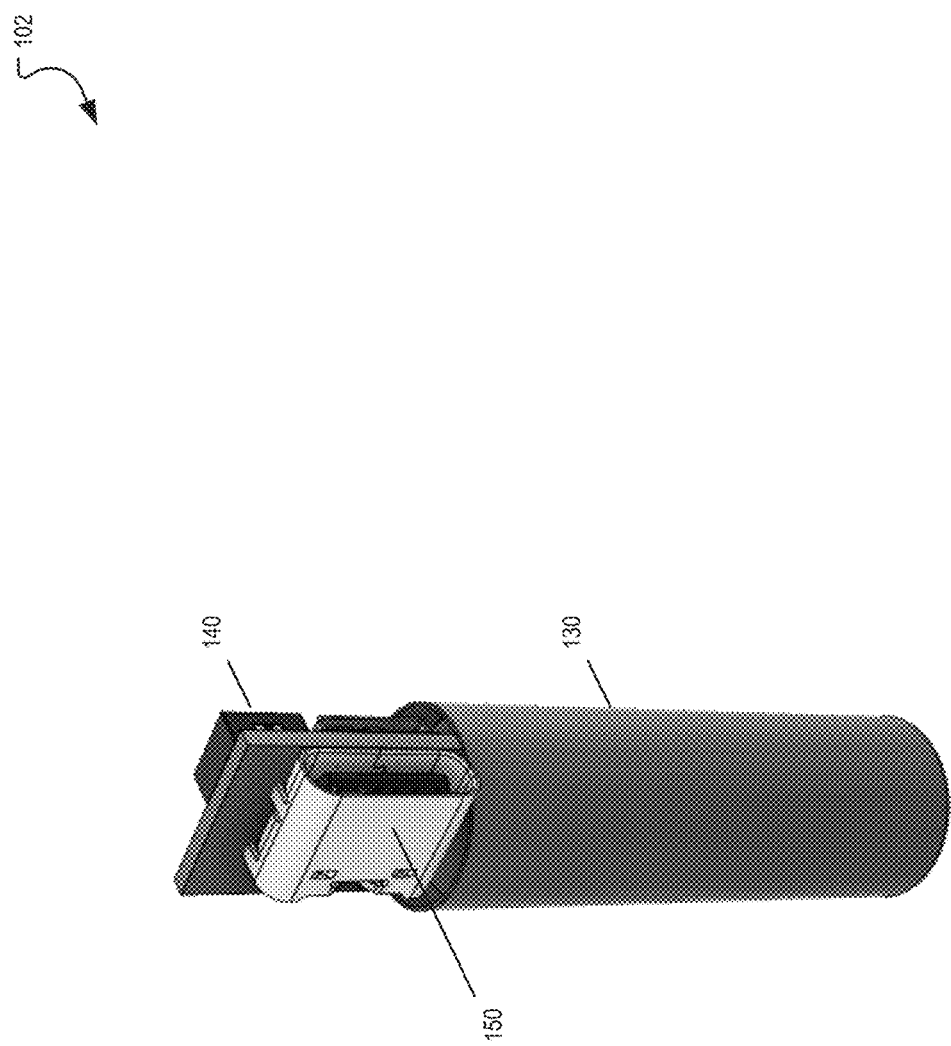
FIG. 2 is a first view of the traceable rechargeable battery system according to an example of the instant disclosure.

FIG. 2 is a diagram of a traceable battery device 102 of the traceable rechargeable battery system 100 according to an example of the instant disclosure. As shown in FIG. 2, the traceable battery device 102 may include the battery 130, the SoC 140, and the recharging port 150. Additionally, the battery device may include an alert device 155 that have one or more speakers capable of emitting an audible sound, one or more light devices, and/or one or more haptic devices that may be capable of vibrating.

Figure 3:
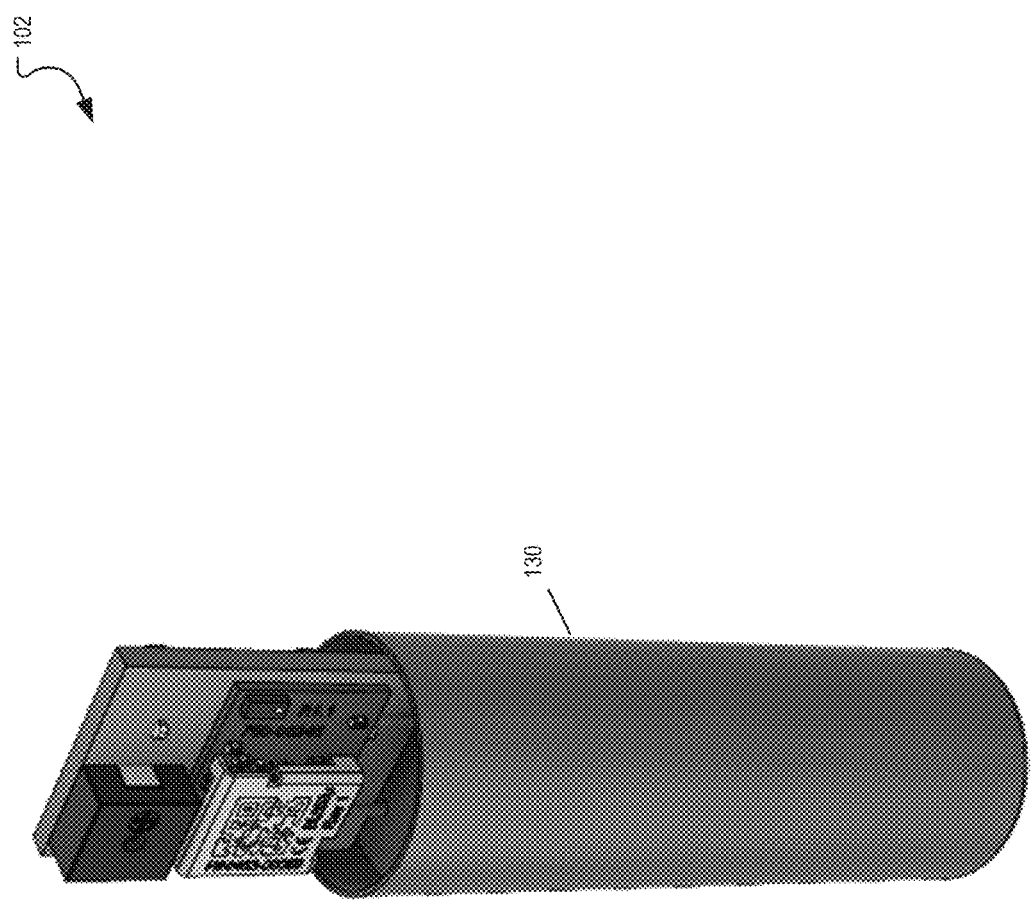
FIG. 3 is another view of the traceable rechargeable battery system according to an example of the instant disclosure.

FIG. 3 is another view of a traceable battery device 102 of the traceable rechargeable battery system 100 according to an example of the instant disclosure. As shown in FIG. 3, the traceable battery device 102 may include the battery 130, the SoC 140 that may include Bluetooth hardware devices, and the recharging port 150 that is out of view in FIG. 3. There also may be an indicator light that may indicate a charging status of the battery 130. Also shown in FIG. 3 is a Bluetooth hardware device, e.g., a Bluetooth transceiver.

Figure 4:
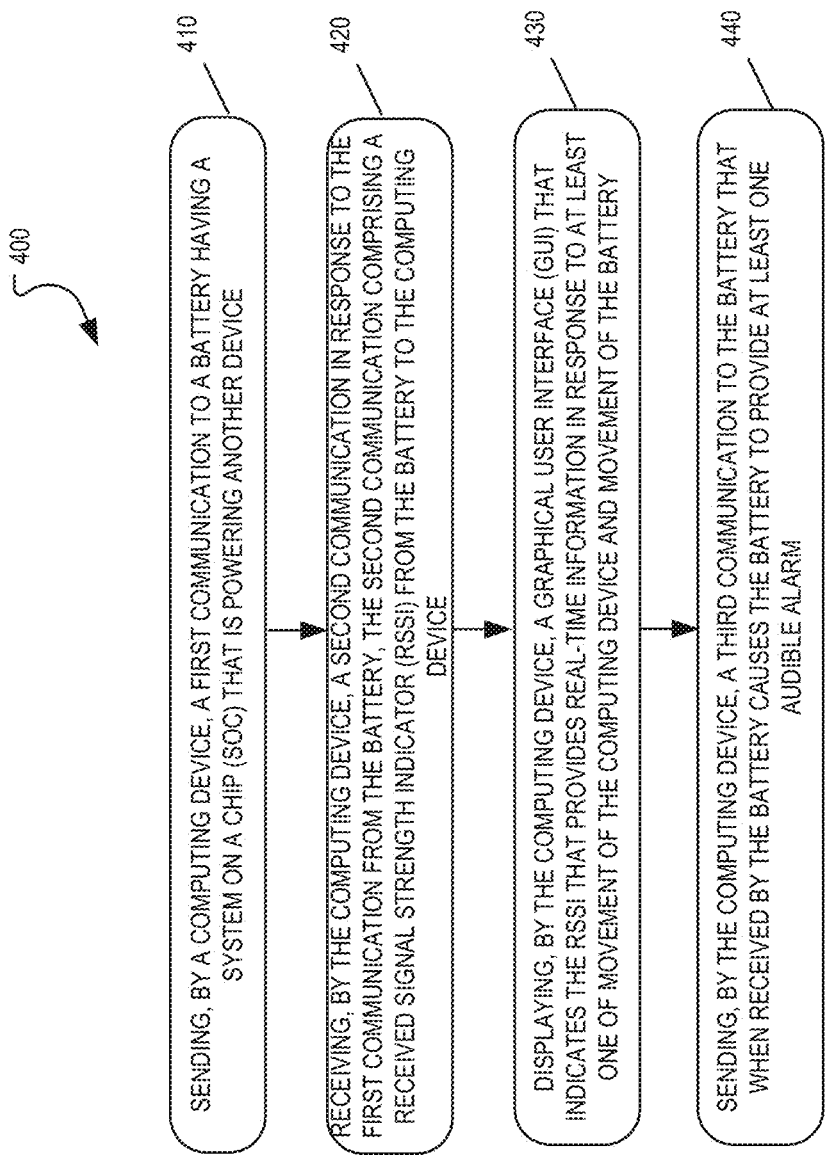
FIG. 4 illustrates an example method of locating a traceable battery device of the traceable rechargeable battery system according to an example of the instant disclosure.

FIG. 4 illustrates an example method of locating a battery device of the traceable rechargeable battery system 100 according to an example of the instant disclosure. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some examples, the method 400 may include sending, by a computing device 104, a first communication to a traceable battery device 102 having a system on a chip (SoC) 140 that is powering another device 180 at block 410. As an example, computing device 104 and the traceable battery device 102 may communicate using Bluetooth. As another example, the computing device 104 and the traceable battery device 102 may communicate using Bluetooth Low Energy (BLE). As an example, the another device 180 comprises one of a remote control device and a toy, among others.

As another example, the computing device 104 and the traceable battery device 102 can communicate using Bluetooth mesh. As another example, the computing device 104 and the traceable battery device 102 can communicate using Zigbee. As another example, the computing device 104 and the traceable battery device 102 can communicate using LoRaWAN.

In one example, the traceable battery device 102 may include one or more rechargeable batteries. As another example, the traceable battery device 102 may include one of an AA battery, a AAA battery, a C battery, a D battery, and a 9V battery, among others.

Next, according to some examples, the method 400 may include receiving, by the computing device 104, a second communication in response to the first communication from the traceable battery device 102, the second communication comprising a received signal strength indicator (RSSI) from the battery 130 to the computing device 104 at block 420.

The second communication also may include other information such as battery power level information, among other information.

Next, according to some examples, the method 400 may include displaying, by the computing device 104, a graphical user interface (GUI) that indicates the RSSI that provides real-time information in response to at least one of movement of the computing device 104 and movement of the traceable battery device 102 at block 430.

Next, according to some examples, the method 400 may include sending, by the computing device, a third communication to the traceable battery device 102 that when received by the battery device 102 causes the traceable battery device 102 to provide at least one audible alert at block 440. As an example, the at least one audible alert may be one of a low level audible alert and a high level audible alert. According to some examples, the method 400 may further include modifying one of a volume of the audible alert and a type of the audible alert in real-time in response to movement of at least one of the battery device 102 and the computing device 104.

In one example, the audible alert may change in realtime response to movement of the computing device 104 and/or the traceable battery device 102. For instance, if the computing device 104 moves closer to the traceable battery device 102, the audible alert may become louder or softer. Alternatively, the audible alert may change from a first alert to a second alert. Alternatively, the audible alert may be repeated more rapidly as the computing device 104 moves closer to the traceable battery device 102. In addition, if the computing device 104 moves further from the traceable battery device 102, the audible alert may become louder or softer. Additionally, a visual alert and/or a haptic alert also may mirror or be similar to the changes in the audible alert based on changing positions in realtime. As an example, the visual alert may become brighter as the computing device 104 moves toward the traceable battery device 102 or the visual alert may change from a first color to a second color as the computing device 104 moves toward the traceable battery device 102. In addition, the haptic alert may become stronger or more robust as the computing device 104 moves toward the traceable battery device 102.

In addition, the computing device 102 may display associated information on the GUI. The GUI may indicate a realtime direction from the computing device 104 to the battery device 102 and display a compass or an arrow that indicates the direction as well as a number of feet from the computing device 104 to the battery device. When the computing device 104 moves toward the battery device 102, the GUI may change from a first color, e.g., black or grey, to a second color, e.g., green. When the computing device 104 moves away from the battery device 102, the GUI may change from the first color to a third color, e.g., red.

According to some examples, the method 400 may include receiving, by a charging base station 170 configured to charge the battery device 102, the first communication from the traceable battery device 102 and receiving, by the charging base station 170, the second communication from the computing device 104, sending a fourth communication by the charging base station 170 to be received by the traceable battery device 102 and the computing device 104, and determining, by the computing device 104, a location of the traceable battery device 102 using multi-dimensional triangulation using an angle of arrival (AoA) of each of the second communication and the fourth communication.

According to some examples, the method 400 may include receiving a request by a hardware button and/or a touchscreen button of the charging base station 170 and sending, by the charging base station 170, another communication to the battery device 102 that when received by the battery device 102 causes the battery device to provide an alert.

According to some examples, the battery device 102 may be recharged by inserting a charging cable connected on a first end to the battery device 102 connected on a second end to the charging base station 170.

According to some examples, the charging base station 170 may have at least one of a USB-A cable or connector, a USB-A Mini cable or connector, a USB-A Micro cable or connector, a USB-B cable or connector, a USB-B Mini cable or connector, a USB-B Micro cable or connector, a USB-C cable or connector, and a lightning cable or connector to receive a charging cable that provides power to charge the battery 130 of the battery device 102.

According to some examples, the method 400 may include displaying a first user interface element that represents the computing device 104 on the GUI and displaying a second user interface element that represents the battery on the GUI, the first user interface element and the second user interface element moving in real-time in response to the RSSI from the battery 130 of the traceable battery device 102.

According to some examples, the traceable battery device 102 may have a first battery of a plurality of battery devices. According to some examples, the method 400 may include displaying by the computing device 104 a list of the plurality of traceable battery devices 102 and information associated with each of the plurality of battery devices including a name of each of the plurality of battery devices, and information associated with an RSSI for each of the plurality of battery devices.

According to some examples, the method 400 may include displaying a first user interface element that represents the computing device 104 on the GUI and displaying a plurality of second user interface elements, each second user interface element representing a battery device 102 of the plurality of battery devices on the GUI, the first user interface element and each of the plurality of second user interface elements moving in real-time in response to the RSSI from each of the plurality of battery devices.

According to some examples, the method 400 may include providing, by the computing device 104, a link loss alert when the RSSI from the traceable battery device 102 is less than a particular level.

According to some examples, the method 400 may include sending, by the computing device 104, the third communication to the traceable battery device 102 that when received by the battery device causes the traceable battery device 102 to provide at least one of at least one visual alert displayed by at least one lighting device connected to the battery device and at least one haptic alert provided by a haptic device connected to the battery device.

Figure 5A:
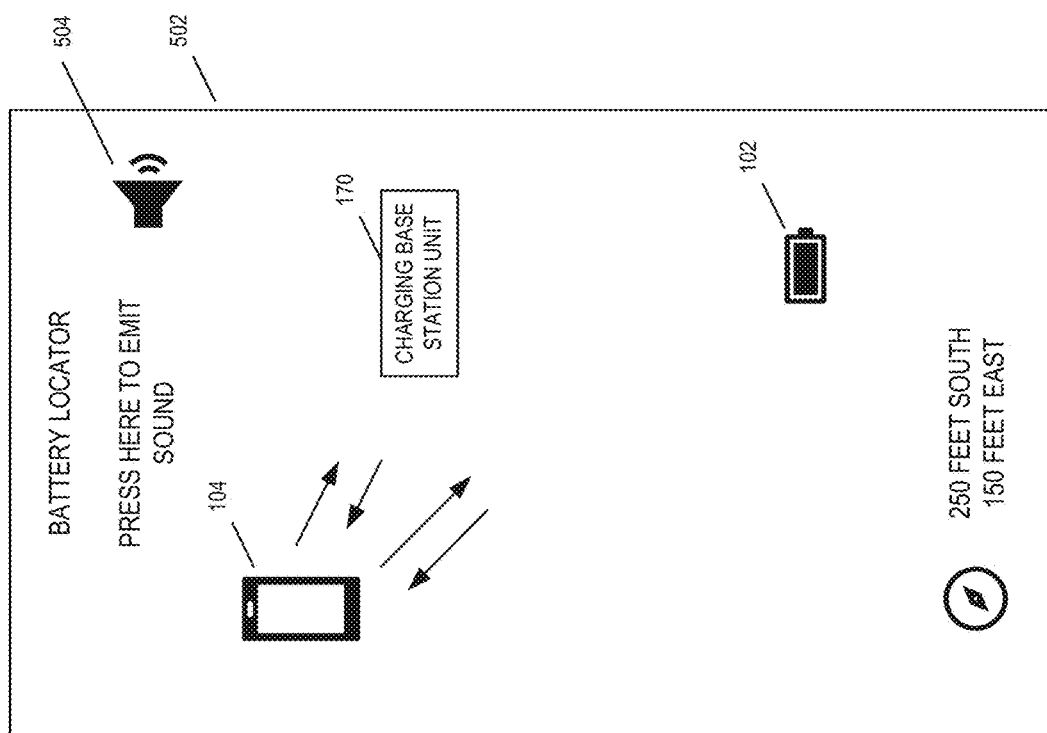
FIG. 5A illustrates a first graphical user interface of a battery tracing application of a computing device according to an example of the instant disclosure.

FIG. 5A shows an example user interface 502 of the battery tracing application 120 displayed by the computing device 104 according to an example of the instant disclosure. As shown in FIG. 5A, the computing device 104 may be shown on a graphical user interface (GUI) having a map that indicates a position of the charging base station unit 170 and at least one traceable battery device 102. The GUI may include at least one button or user interface element that when selected may cause the traceable battery device 102 to provide at least one of an audible alarm or alert, a visual alarm or alert, and a haptic alarm or alert. The GUI also indicates a real-time location of the traceable battery device 102 as well as walking directions or another type of directions from the computing device 104 to the traceable battery device 102. As an example, the directions may be 250 feet south and 150 feet east. The user interface may further provide a compass user interface element or an arrow user interface element that may point in a real-time direction from the computing device 104 to the traceable battery device 102. As another example, the user interface may display the compass user interface element or an arrow user interface element and a number of feet from the computing device 104 to the traceable battery device 102, e.g., twenty feet to your right or twenty feet behind. This may be displayed in a first color such as black or grey. When the computing device 104 is moving toward the traceable battery device 102, the graphical user interface may provide an indication such as displaying in a second color such as green. When the computing device 104 is moving away from the traceable battery device 102, the graphical user interface may provide an indication such as displaying in a third color such as red.

Figure 5B:
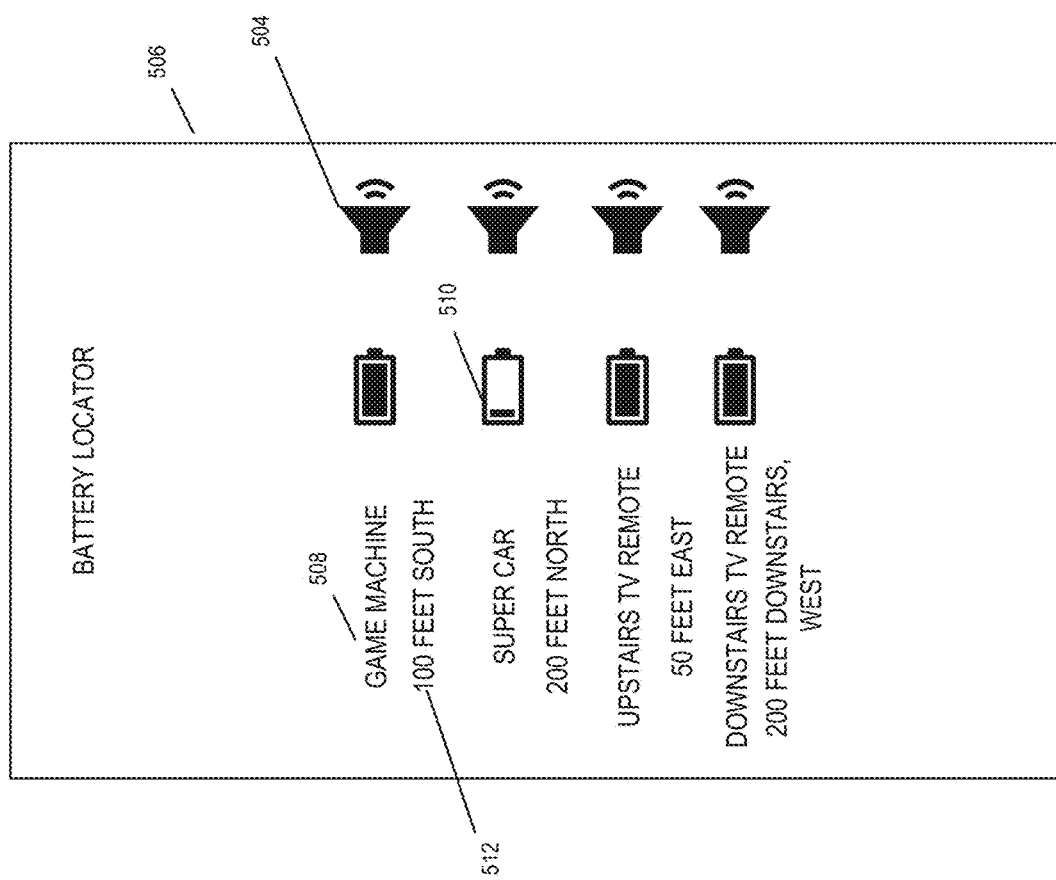
FIG. 5B illustrates a second graphical user interface of the battery tracing application of the computing device according to an example of the instant disclosure.

FIG. 5B shows another example user interface 506 of the battery tracing application 120 displayed by the computing device 104 according to an example of the instant disclosure. As shown in FIG. 5B, there may be a list of one or more battery devices and a user assigned or system assigned name 508 for each traceable battery device 102. The user assigned name or system assigned name may be associated with another device that the traceable battery device 102 is powering such as a game machine, e.g., a game controller or portable video gaming system, a super car, e.g., a remote control car or vehicle, an upstairs television remote, and a downstairs television remote, among others. Each traceable battery device 102 also may show a real-time location 512 and directional information from a current position of the computing device 104. In addition, for each of the one or more battery devices, there may be a battery icon 510 that may indicate a real-time battery percentage for the battery device as well as a button or user interface element that when selected may cause the traceable battery device 102 to provide at least one of an audible alarm, a visual alarm, and a haptic alarm.

Figure 6:
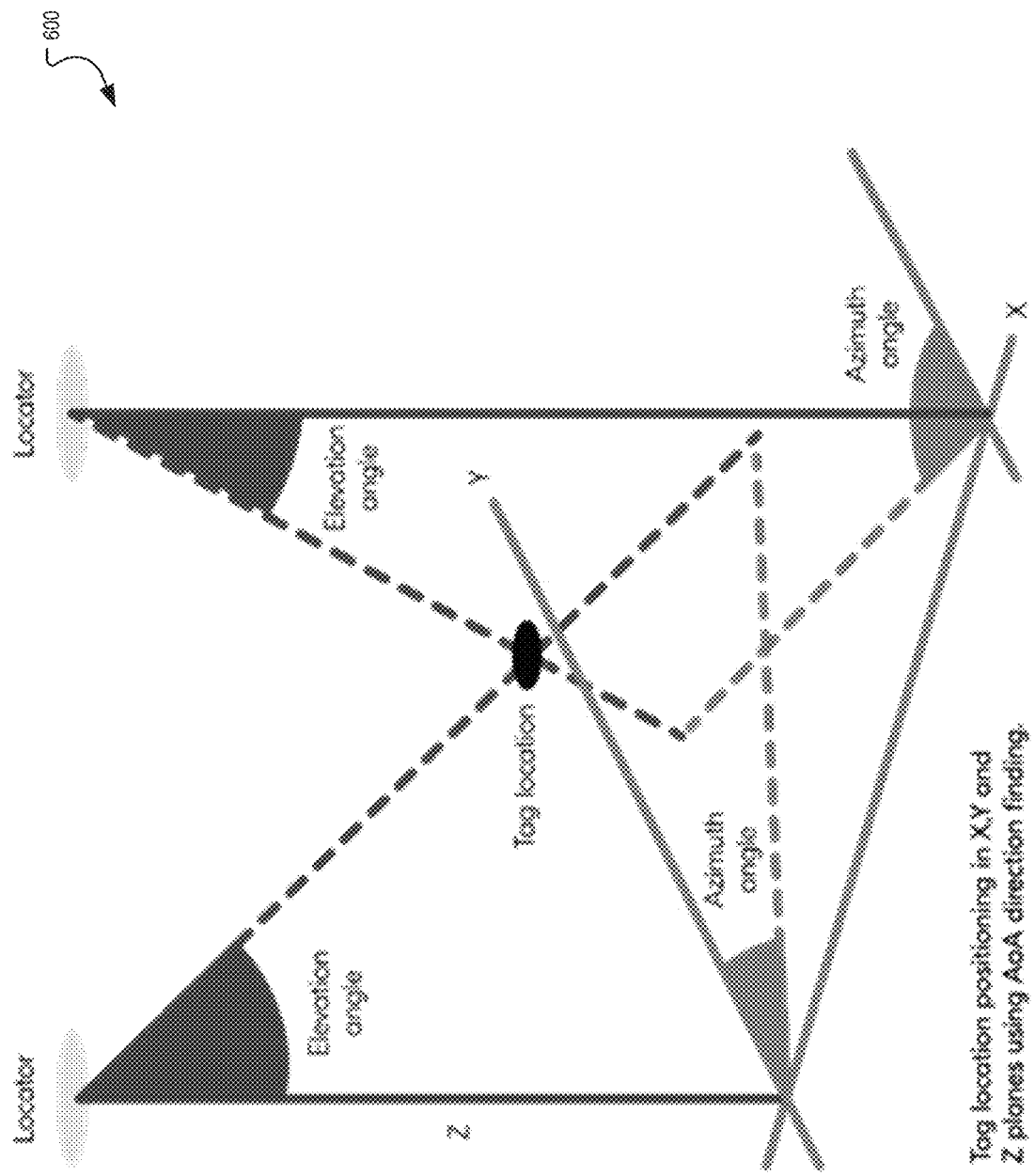
FIG. 6 illustrates an example location positioning methodology of a traceable battery device according to an example of the instant disclosure.

FIG. 6 illustrates an example location positioning methodology 600 of a battery 130 of the traceable rechargeable battery system 100 according to an example of the instant disclosure. As shown in FIG. 6, the may be a first device or locator such as the computing device 104 and another device or locator such as the base station unit 170. Each of the locators may be used to locate the traceable battery device 102 using positioning in X, Y, and Z planes using AoA direction finding. Each locator may utilize an elevation angle and an azimuth angle to determine a position of the traceable battery device 102.

FIG. 7 illustrates another example location positioning methodology 700 of a battery 130 of the traceable rechargeable battery system 100 according to an example of the instant disclosure.

As shown in FIG. 7, in (A) a first locator may be used to determine a location of a traceable battery device 102 that may be located in a vehicle. The location of the traceable battery device 102 may be determined using an angle $\theta$ and a determined distance p. x may be $p*\sin(\theta)$ and y may be $p*\cos(\theta)$.

In (B), there may be a first locator and a second locator that may be used together to determine a location of a traceable battery device 102 by using a first angle $\theta_1$ and a second angle $\theta_2$. y may be $y_2*\tan(\theta_2)-x_2/\tan(\theta_2)-\tan(\theta_1)$. X may be $y*\tan(\theta_1)$.

Figure 8:
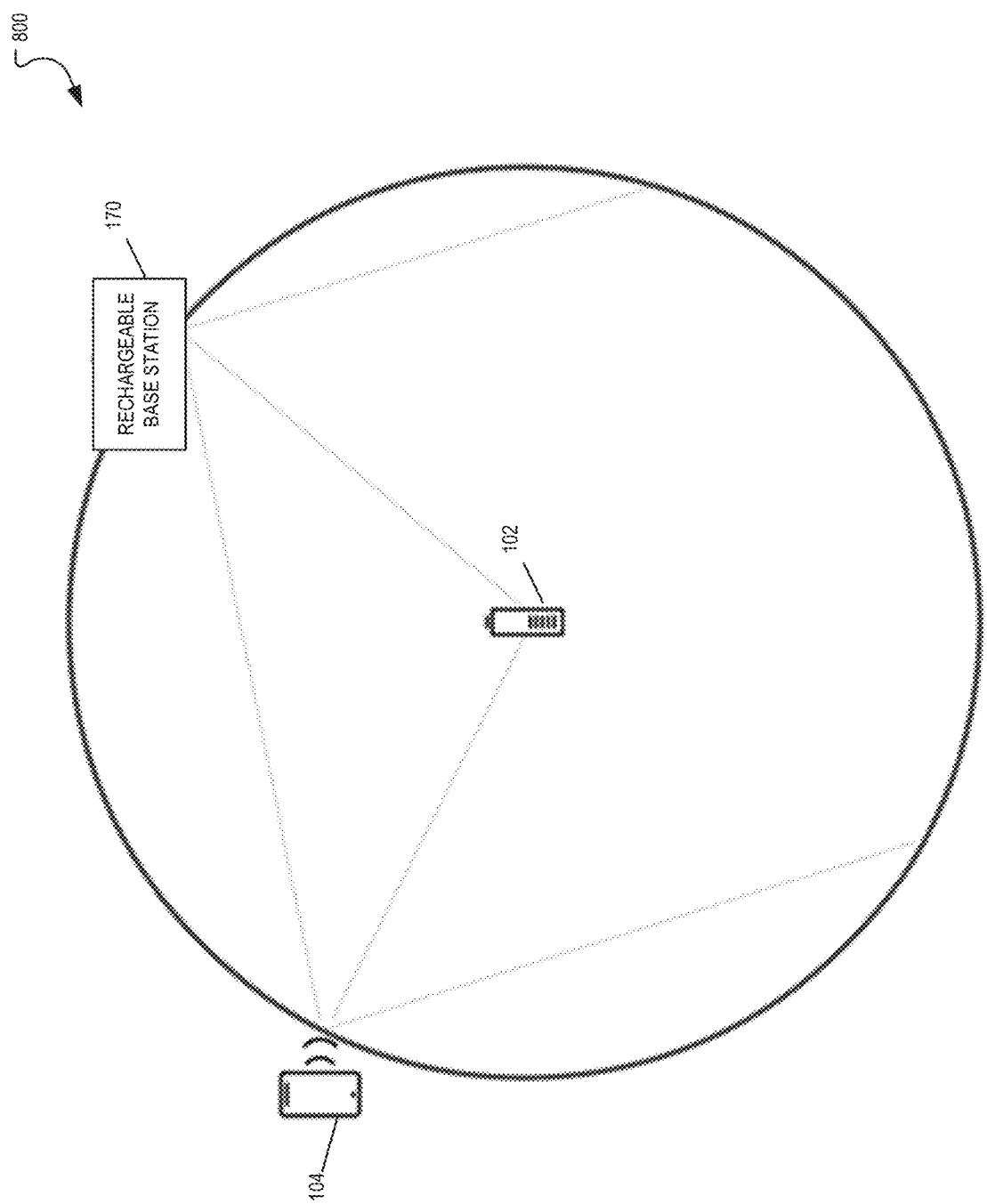
FIG. 8 illustrates another example location positioning methodology of a traceable battery device according to an example of the instant disclosure.

FIG. 8 illustrates another example location positioning methodology 800 of a battery 130 of the traceable rechargeable battery system 100 according to an example of the instant disclosure. As shown in FIG. 8, a location of a traceable battery device 102 may be determined using a first locator such as the computing device 104 and a second locator such as a rechargeable base station unit 170 for the battery 130 of the traceable battery device 102.

Figure 9:
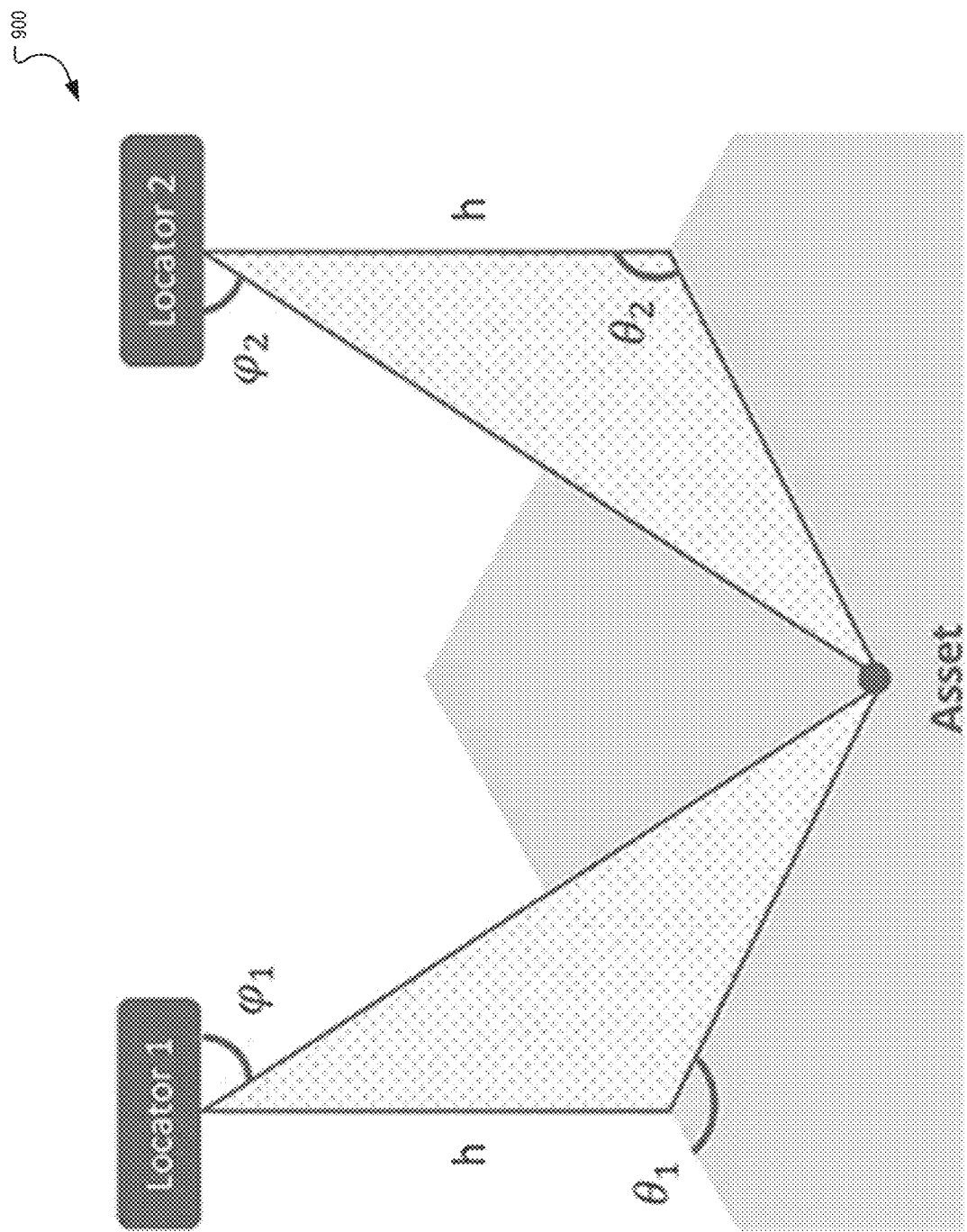
FIG. 9 illustrates another example location positioning methodology of a traceable battery device according to an example of the instant disclosure.

FIG. 9 illustrates another example location positioning methodology 900 of a battery 130 of the traceable rechargeable battery system 100 according to an example of the instant disclosure. As shown in FIG. 9, there may be a first locator such as the computing device 104 and a second locator such as the rechargeable base station unit 170 for the battery 130.

Figure 10:
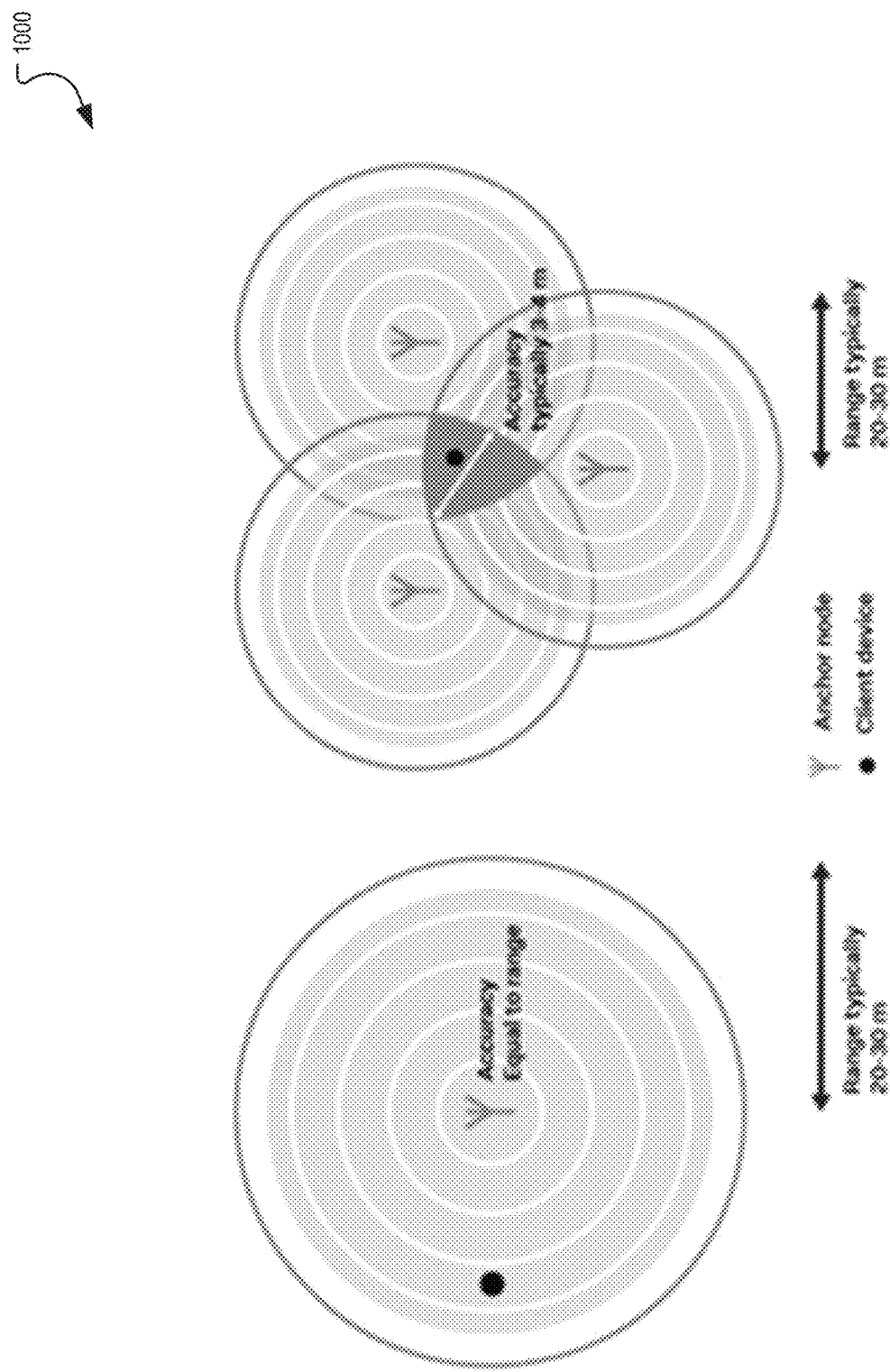
FIG. 10 illustrates another example location positioning methodology of a traceable battery device according to an example of the instant disclosure.

FIG. 10 illustrates another example location positioning methodology 1000 of a battery 130 of the traceable rechargeable battery system 100 according to an example of the instant disclosure. As shown in FIG. 10, when one locator is used such as the computing device 104, the accuracy of a location of the asset or traceable battery device 102 may be approximately twenty to thirty meters. However, when more than one locator is used such as three locators, accuracy can be improved to three to four meters.

FIG. 11 illustrates triangulation-based location estimation 1100 of a battery 130 of the traceable rechargeable battery system 100 according to an example of the instant disclosure. As shown in FIG. 11, each of the locators may be Bluetooth beacons such as Bluetooth Beacon one, Bluetooth Beacon two, and Bluetooth beacon three, among others. A Bluetooth Low Energy device may be at a location such as a common intersection point.

Figure 12:
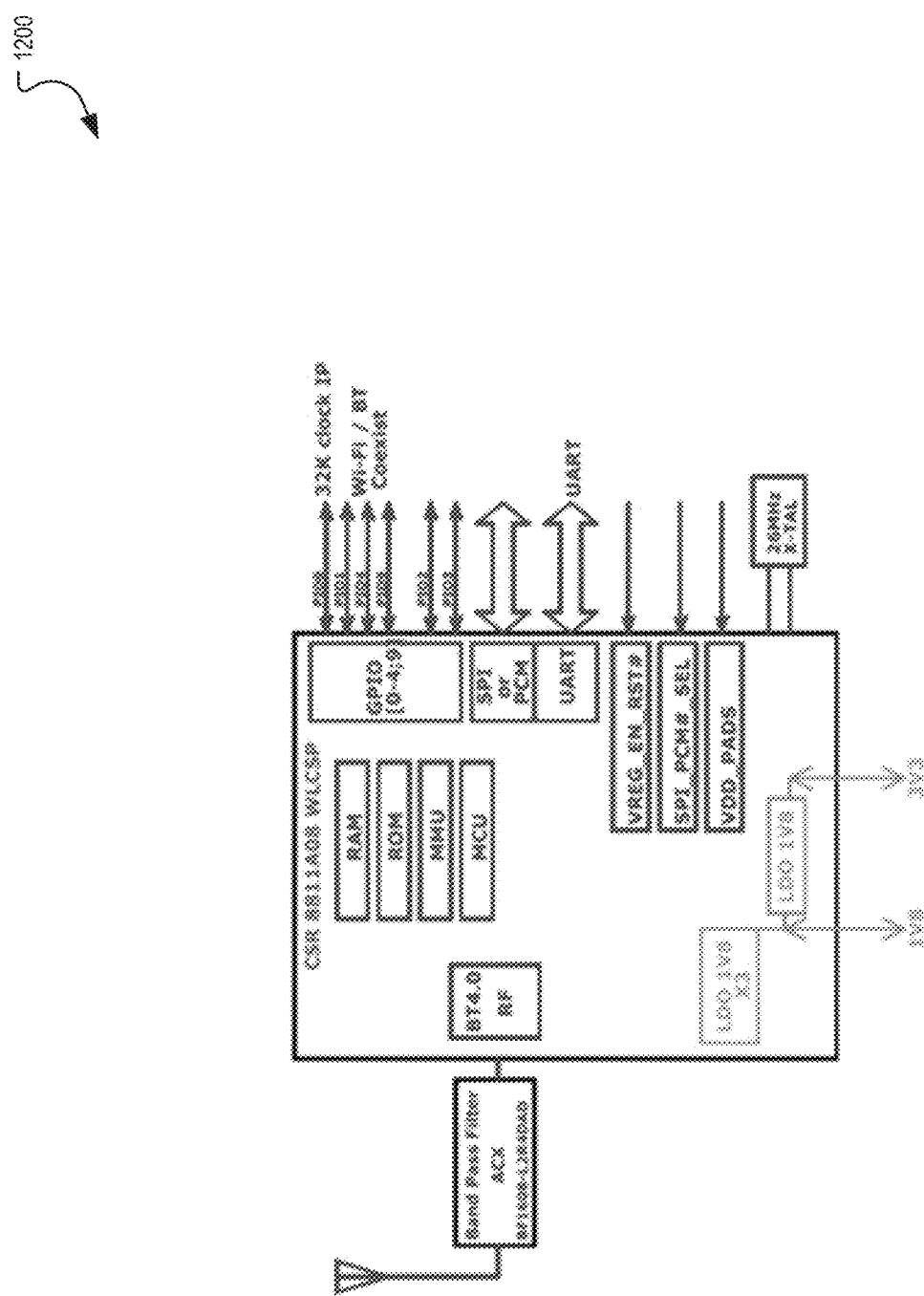
FIG. 12 illustrates an example diagram of the traceable battery device according to an example of the instant disclosure.

FIG. 12 illustrates an example diagram of the battery device 102 according to an example of the instant disclosure. As shown in FIG. 12, the battery device 102 may include the SoC 140 having a number of components such as RAM, ROM, an MMU, an MCU, a Bluetooth hardware device, and other hardware devices.

Figure 13:
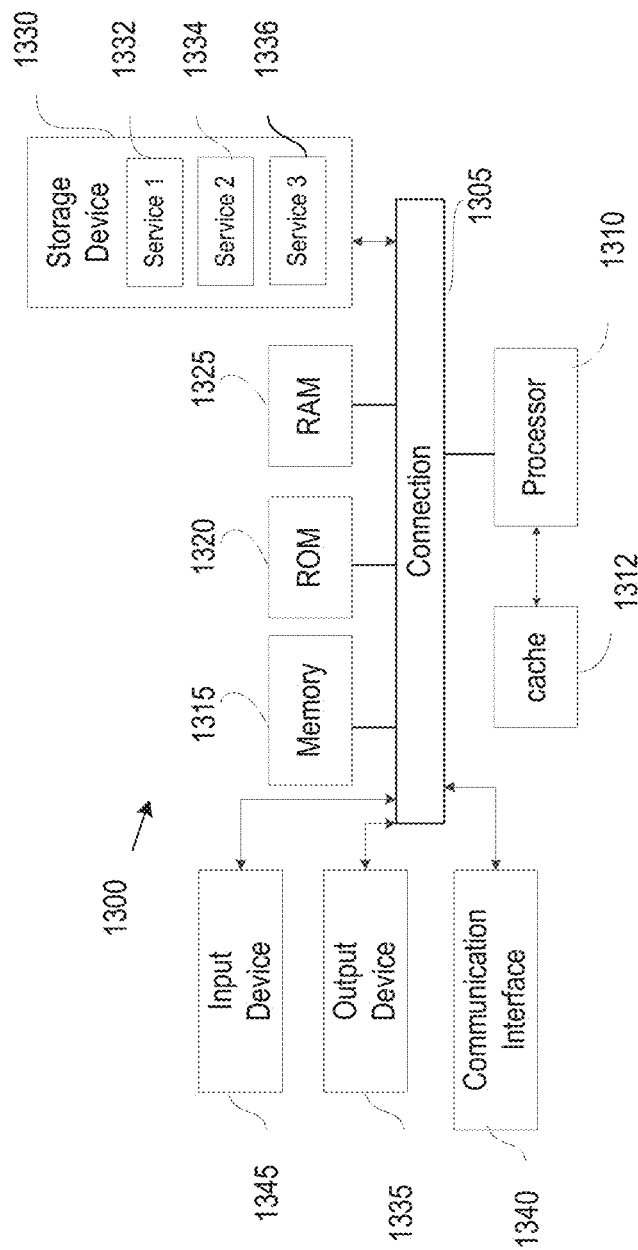
FIG. 13 shows an example of a system for implementing certain aspects of the present technology according to an example of the instant disclosure.

FIG. 13 shows an example of computing system 1300, which can be for example any computing device making up the computing device such as the SoC 140 of the traceable battery device 102, the computing device 104, or any component thereof in which the components of the system are in communication with each other using connection 1305. Connection 1305 can be a physical connection via a bus, or a direct connection into processor 1310, such as in a chipset architecture. Connection 1305 can also be a virtual connection, networked connection, or logical connection.

In some embodiments, computing system 1300 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1300 includes at least one processing unit (CPU or processor) 1310 and connection 1305 that couples various system components including system memory 1315, such as read-only memory (ROM) 1320 and random access memory (RAM) 1325 to processor 1310. Computing system 1300 can include a cache of high-speed memory 1312 connected directly with, in close proximity to, or integrated as part of processor 1310.

Processor 1310 can include any general purpose processor and a hardware service or software service, such as services 1332, 1334, and 1336 stored in storage device 1330, configured to control processor 1310 as well as a special-purpose processor where software instructions are incorporated into the actual processor design. Processor 1310 may essentially be a completely self-contained computing system, containing multiple cores or processors, a bus, memory controller, cache, etc. A multi-core processor may be symmetric or asymmetric.

To enable user interaction, computing system 1300 includes an input device 1345, which can represent any number of input mechanisms, such as a microphone for speech, a touch-sensitive screen for gesture or graphical input, keyboard, mouse, motion input, speech, etc. Computing system 1300 can also include output device 1335, which can be one or more of a number of output mechanisms known to those of skill in the art. In some instances, multimodal systems can enable a user to provide multiple types of input/output to communicate with computing system 1300. Computing system 1300 can include communications interface 1340, which can generally govern and manage the user input and system output. There is no restriction on operating on any particular hardware arrangement, and therefore the basic features here may easily be substituted for improved hardware or firmware arrangements as they are developed.

Storage device 1330 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1330 can include software services, servers, services, etc., that when the code that defines such software is executed by the processor 1310, it causes the system to perform a function. In some embodiments, a hardware service that performs a particular function can include the software component stored in a computer-readable medium in connection with the necessary hardware components, such as processor 1310, connection 1305, output device 1335, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Illustrative examples of the disclosure include:

Aspect 1: A method comprising sending, by a computing device, a first communication to a battery device having a system on a chip (SoC) that is powering another device, receiving, by the computing device, a second communication in response to the first communication from the battery device, the second communication comprising a received signal strength indicator (RSSI) from the battery to the computing device, displaying, by the computing device, a graphical user interface (GUI) that indicates the RSSI that provides real-time information in response to at least one of movement of the computing device and movement of the battery device, and sending, by the computing device, a third communication to the battery device that when received by the battery device causes the battery device to provide at least one audible alert.

Aspect 2: The method of Aspect 1, further comprising receiving, by a charging base station configured to charge the battery device, the first communication from the battery device and receiving, by the charging base station, the second communication from the computing device, sending a fourth communication by the charging base station to be received by the battery device and the computing device, and determining, by the computing device, a location of the battery device using multi-dimensional triangulation using an angle of arrival (AoA) of each of the second communication and the fourth communication.

Aspect 3: The method of Aspects 1 and 2, further comprising receiving a request by a hardware button of the charging base station and sending, by the charging base station, another communication to the battery device that when received by the battery device causes the battery device to provide an alert.

Aspect 4: The method of Aspects 1 to 3, wherein the computing device and the battery device communicate using Bluetooth.

Aspect 5: The method of Aspects 1 to 4, wherein the computing device and the battery device communicate using Bluetooth Low Energy (BLE).

Aspect 6: The method of Aspects 1 to 5, wherein the battery device comprises a rechargeable battery.

Aspect 7: The method of Aspects 1 to 6, wherein the battery device comprises one of an AA battery, a AAA battery, a C battery, a D battery, and a 9V battery.

Aspect 8: The method of Aspects 1 to 7, further comprising recharging a battery of the battery device by inserting a charging cable connected on a first end to the battery device and connected on a second end to the charging base station.

Aspect 9: The method of Aspects 1 to 8, wherein the charging base station comprises at least one of a USB-A cable or connector, a USB-A Mini cable or connector, a USB-A Micro cable or connector, a USB-B cable or connector, a USB-B Mini cable or connector, a USB-B Micro cable or connector, a USB-C cable or connector, and a lightning cable or connector to receive a charging cable that provides power to charge a battery of the battery device.

Aspect 10: The method of Aspects 1 to 9, further comprising displaying a first user interface element that represents the computing device on the GUI and displaying a second user interface element that represents the battery on the GUI, the first user interface element and the second user interface element moving in real-time in response to the RSSI from the battery.

Aspect 11: The method of Aspects 1 to 10, wherein the battery device comprises a first battery of a plurality of battery devices, the method further comprising displaying by the computing device a list of the plurality of battery devices and information associated with each of the plurality of battery devices including a name of each of the plurality of battery devices, and information associated with an RSSI for each of the plurality of battery devices.

Aspect 12: The method of Aspects 1 to 11, further comprising displaying a first user interface element that represents the computing device on the GUI and displaying a plurality of second user interface elements, each second user interface element representing a battery device of the plurality of battery devices on the GUI, the first user interface element and each of the plurality of second user interface elements moving in real-time in response to the RSSI from each of the plurality of battery devices.

Aspect 13: The method of Aspects 1 to 12, further comprising modifying one of a volume of the audible alert in realtime in response to movement of the at least one of the battery device and the computing device.

Aspect 14: The method of Aspects 1 to 13, wherein the at least one audible alert comprises one of a low level audible alert and a high level audible alert.

Aspect 15: The method of Aspects 1 to 14, further comprising providing, by the computing device, a link loss alert when the RSSI from the battery device is less than a particular level.

Aspect 16: The method of Aspects 1 to 15, further comprising sending, by the computing device, the third communication to the battery device that when received by the battery device causes the battery device to provide at least one visual alert displayed by at least one lighting device connected to the battery device and at least one haptic alert provided by a haptic device connected to the battery device.

Aspect 17: The method of Aspects 1 to 16, wherein the computing device and the battery device communicate using Bluetooth mesh.

Aspect 18: The method of Aspects 1 to 17, wherein the computing device and the battery device communicate using at least one of a Zigbee network, a LoRaWAN network, a Wi-Fi network, a Z-wave network, a near field communication (NFC) network, a MQTT network, and a cellular network.

Aspect 19: A system comprising a computing device comprising a memory storing computer-readable instructions and at least one processor to execute the instructions to send a first communication to a battery device having a system on a chip (SoC) that is powering another device, receive a second communication in response to the first communication from the battery device, the second communication comprising a received signal strength indicator (RSSI) from the battery to the computing device, display a graphical user interface (GUI) that indicates the RSSI that provides real-time information in response to at least one of movement of the computing device and movement of the battery device, and send a third communication to the battery device that when received by the battery device causes the battery device to provide at least one audible alert.

Aspect 20: A non-transitory computer-readable storage medium comprising instructions stored thereon that, when executed by a computing device cause the computing device to perform operations, the operations comprising sending a first communication to a battery device having a system on a chip (SoC) that is powering another device, receiving a second communication in response to the first communication from the battery device, the second communication comprising a received signal strength indicator (RSSI) from the battery to the computing device, displaying a graphical user interface (GUI) that indicates the RSSI that provides real-time information in response to at least one of movement of the computing device and movement of the battery device, and sending a third communication to the battery device that when received by the battery device causes the battery device to provide at least one audible alert.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method comprising:
  sending, by a computing device, a first communication to a battery device having a system on a chip (SoC) that is powering another device;
  receiving, by the computing device, a second communication in response to the first communication from the battery device, the second communication comprising a received signal strength indicator (RSSI) from the battery device to the computing device;

displaying, by the computing device, a graphical user interface (GUI) that indicates the RSSI that provides real-time information in response to at least one of movement of the computing device and movement of the battery device;

sending, by the computing device, a third communication to the battery device that when received by the battery device causes the battery device to provide at least one audible alert;

receiving, by a charging base station configured to charge the battery device, the first communication from the battery device and receiving, by the charging base station, the second communication from the computing device;

sending a fourth communication by the charging base station to be received by the battery device and the computing device; and determining, by the computing device, a location of the battery device using multi-dimensional triangulation using an angle of arrival (AoA) of each of the second communication and the fourth communication.

2. The method of claim 1, further comprising receiving a request by a hardware button of the charging base station and sending, by the charging base station, another communication to the battery device that when received by the battery device causes the battery device to provide an alert.

3. The method of claim 1, wherein the computing device and the battery device communicate using Bluetooth.

4. The method of claim 1, wherein the computing device and the battery device communicate using Bluetooth Low Energy (BLE).

5. The method of claim 1, wherein the battery device comprises a rechargeable battery.

6. The method of claim 1, wherein the battery device comprises one of an AA battery, a AAA battery, a C battery, a D battery, and a 9V battery.

7. The method of claim 1, further comprising recharging a battery of the battery device by inserting a charging cable connected on a first end to the battery device and connected on a second end to the charging base station.

8. The method of claim 7, wherein the charging base station comprises at least one of a USB-A cable or connector, a USB-A Mini cable or connector, a USB-A Micro cable or connector, a USB-B cable or connector, a USB-B Mini cable or connector, a USB-B Micro cable or connector, a USB-C cable or connector, and a lightning cable or connector to receive a charging cable that provides power to charge a battery of the battery device.

9. The method of claim 1, further comprising displaying a first user interface element that represents the computing device on the GUI and displaying a second user interface element that represents the battery on the GUI, the first user interface element and the second user interface element moving in real-time in response to the RSSI from the battery.

10. The method of claim 1, wherein the battery device comprises a first battery of a plurality of battery devices, the method further comprising displaying by the computing device a list of the plurality of battery devices and information associated with each of the plurality of battery devices including a name of each of the plurality of battery devices, and information associated with an RSSI for each of the plurality of battery devices.

11. The method of claim 10, further comprising displaying a first user interface element that represents the computing device on the GUI and displaying a plurality of second user interface elements, each second user interface element representing a battery device of the plurality of battery devices on the GUI, the first user interface element and each of the plurality of second user interface elements moving in real-time in response to the RSSI from each of the plurality of battery devices.

12. The method of claim 1, further comprising modifying one of a volume of the audible alert and a type of the audible alert in real-time in response to movement of at least one of the battery device and the computing device.

13. The method of claim 1, wherein the at least one audible alert comprises one of a low level audible alert and a high level audible alert.

14. The method of claim 1, further comprising providing, by the computing device, a link loss alert when the RSSI from the battery device is less than a particular level.

15. The method of claim 1, further comprising sending, by the computing device, the third communication to the battery device that when received by the battery device causes the battery device to provide one of at least one visual alert displayed by at least one lighting device connected to the battery device and at least one haptic alert provided by a haptic device connected to the battery device.

16. The method of claim 1, wherein the computing device and the battery device communicate using Bluetooth mesh.

17. The method of claim 1, wherein the computing device and the battery device communicate using at least one of a Zigbee network, a LoRaWAN network, a Wi-Fi network, a Z-wave network, a near field communication (NFC) network, a MQTT network, and a cellular network.

18. A system comprising:
a computing device comprising a memory storing computer-readable instructions; and
at least one processor to execute the instructions to:
send a first communication to a battery device having a system on a chip (SoC) that is powering another device;
receive a second communication in response to the first communication from the battery device, the second communication comprising a received signal strength indicator (RSSI) from the battery device to the computing device;
display a graphical user interface (GUI) that indicates the RSSI that provides real-time information in response to at least one of movement of the computing device and movement of the battery device;
send a third communication to the battery device that when received by the battery device causes the battery device to provide at least one audible alert;
receive by a charging base station configured to charge the battery device, the first communication from the battery device and receiving, by the charging base station, the second communication from the computing device;
send a fourth communication by the charging base station to be received by the battery device and the computing device; and
determine a location of the battery device using multi-dimensional triangulation using an angle of arrival (AoA) of each of the second communication and the fourth communication.

19. A non-transitory computer-readable storage medium comprising instructions stored thereon that, when executed by a computing device cause the computing device to perform operations, the operations comprising:
sending a first communication to a battery device having a system on a chip (SoC) that is powering another device;

receiving a second communication in response to the first communication from the battery device, the second communication comprising a received signal strength indicator (RSSI) from the battery device to the computing device;

displaying a graphical user interface (GUI) that indicates the RSSI that provides real-time information in response to at least one of movement of the computing device and movement of the battery device;

sending a third communication to the battery device that when received by the battery device causes the battery device to provide at least one audible alert;

receiving, by a charging base station configured to charge the battery device, the first communication from the battery device and receiving, by the charging base station, the second communication from the computing device;

sending a fourth communication by the charging base station to be received by the battery device and the computing device; and determining a location of the battery device using multi-dimensional triangulation using an angle of arrival (AoA) of each of the second communication and the fourth communication.

* * * * *